(12) United States Patent
Chou

(10) Patent No.: US 11,994,178 B2
(45) Date of Patent: May 28, 2024

(54) UNIVERSAL JOINT

(71) Applicant: RE-DAI PRECISION TOOLS CO., LTD., Taichung (TW)

(72) Inventor: Yi-Chiu Chou, Taichung (TW)

(73) Assignee: RE-DAI PRECISION TOOLS CO., LTD., Taichung (TW)

( * ) Notice: Subject to any disclaimer, the term of this patent is extended or adjusted under 35 U.S.C. 154(b) by 429 days.

(21) Appl. No.: 17/400,655

(22) Filed: Aug. 12, 2021

(65) Prior Publication Data

US 2022/0082133 A1 Mar. 17, 2022

(30) Foreign Application Priority Data

Sep. 17, 2020 (TW) ................. 109132088

(51) Int. Cl.
   *F16D 3/221* (2006.01)
   *B25B 13/48* (2006.01)
   *B25B 23/00* (2006.01)
   *F16D 3/18* (2006.01)

(52) U.S. Cl.
   CPC ............ *F16D 3/221* (2013.01); *B25B 13/481* (2013.01); *B25B 23/0028* (2013.01); *B25B 23/0035* (2013.01); *F16D 3/185* (2013.01)

(58) Field of Classification Search
   CPC ....... F16D 3/221; F16D 3/185; B25B 13/481; B25B 23/0028; B25B 23/0035
   USPC ........................................ 464/106, 158, 159
   See application file for complete search history.

(56) References Cited

U.S. PATENT DOCUMENTS

| | | | |
|---|---|---|---|
| 5,738,586 A * | 4/1998 | Arriaga | F16D 1/101 464/106 |
| 6,145,416 A | 11/2000 | Bonniot | |
| 6,626,067 B1 * | 9/2003 | Iwinski | B25B 23/108 |
| 6,655,888 B2 * | 12/2003 | Schultz | B25B 13/065 |
| 7,966,915 B2 | 6/2011 | Chen | |
| 8,956,236 B2 | 2/2015 | Chu | |
| 10,661,416 B2 | 5/2020 | Su | |
| 11,614,119 B2 * | 3/2023 | Chang | F16C 11/0623 |
| 2018/0185994 A1 | 7/2018 | Su | |

FOREIGN PATENT DOCUMENTS

| | | |
|---|---|---|
| CN | 2420485 Y | 2/2001 |
| TW | M364585 U | 9/2009 |
| TW | M369834 U | 12/2009 |
| TW | M372767 U | 1/2010 |

(Continued)

*Primary Examiner* — Greg Binda
(74) *Attorney, Agent, or Firm* — Muncy, Geissler, Olds & Lowe, P.C.

(57) ABSTRACT

A universal joint includes a socket member and a driving member. The socket member includes a receiving hole, and an inner periphery of the receiving hole is formed with first evading portions and first abutting portions staggered with each other to cause the first abutting portions not connected to each other. Each first abutting portion is provided with a first abutting face, a second abutting face, and an adjacent edge formed between the first abutting face and the second abutting face. One side of the adjacent edge forms an adjacent edge angle being greater than 177 degrees and less than 180 degrees. The driving member includes a rounded base arranged in the receiving hole and a driving column opposite to the rounded base.

7 Claims, 4 Drawing Sheets

(56) References Cited

FOREIGN PATENT DOCUMENTS

| | | |
|---|---|---|
| TW | M384742 U | 7/2010 |
| TW | M399777 U | 3/2011 |
| TW | M448354 U | 3/2013 |
| TW | I466762 B | 1/2015 |
| TW | I482689 B | 5/2015 |
| TW | M600677 U | 9/2020 |

* cited by examiner

UNIVERSAL JOINT

BACKGROUND OF THE INVENTION

The present invention relates to a universal joint and, more particularly, to a universal joint for power tools.

Taiwan Utility Model Patent No. TWM369834 discloses a universal tool adaptor including a driving rod body and a receiving sleeve. One end of the driving rod body corresponding to the receiving sleeve is formed with a spherical head. An outer edge of the spherical head is formed with end corner portions by equiangular cross surfaces, and one end of the receiving sleeve is formed with a socket hole receiving the spherical head. An inner edge of the socket hole near an opening can use a fastening ring to selectively restrict the spherical head of the driving rod body, and the inner edge of the socket hole is formed with a plurality of arc convex abutting edges or convex cone abutting edges corresponding to the cross surfaces of the spherical head, so that the end corner portions and each two adjacent arc convex abutting edges or convex cone abutting edges respectively form a evading groove.

The inner surface of the socket hole of the receiving sleeve is mainly composed of convex arc surfaces and concave arc surfaces to cause the hexagonal spherical head capable pivoting relative to the socket hole of the receiving sleeve. However, the torque at the moment of starting the power tool is quite large, the spherical head may be stuck in the socket hole under the large torsion.

In view of the above, a need exists for a universal joint that mitigates and/or obviates the above drawbacks.

BRIEF SUMMARY OF THE INVENTION

An objective of the present invention is to provide a universal joint including a socket member and a driving member. The socket member defines a first end and a second end opposite the first end and includes a receiving hole axially extending inward from the second end along a first reference axis. An inner periphery of the receiving hole is formed with a plurality of first evading portions and a plurality of first abutting portions respectively extending linearly along a direction parallel to the first reference axis and staggered with each other to cause the plurality of first abutting portions not connected to each other. Each of the plurality of first abutting portions is provided with a first abutting face, a second abutting face connected to the first abutting face, and an adjacent edge formed between the first abutting face and the second abutting face and extending along the direction parallel to the first reference axis. One side of the adjacent edge opposite to the first reference axis forms an adjacent edge angle being greater than 177 degrees and less than 180 degrees. The driving member axially extends along a second reference axis and has a rounded base arranged in the receiving hole and a driving column opposite to the rounded base.

In an example, the adjacent edge angle is 178 degrees.

In an example, any one of the plurality of first evading portions is in the shape of a circular arc on a reference plane perpendicular to the first reference axis. One side of the first abutting face opposite to the second abutting face is connected to one of the plurality of first evading portions. One side of the second abutting face opposite to the first abutting face is connected to another one of the plurality of first evading portions.

In an example, an outer periphery of the rounded base forms a plurality of second evading portions and a plurality of second abutting portions staggered with each other around the second reference axis. The plurality of second evading portions corresponds the plurality of first evading portions. The plurality of second abutting portions corresponds the plurality of first abutting portions. Any one of the plurality of second evading portions is in the shape of a circular arc on a reference plane perpendicular to the second reference axis. Any one of the plurality of second abutting portions is in the shape of a straight line on a reference plane perpendicular to the second reference axis.

In an example, the circular arc of any one of the plurality of first evading portions on the reference plane perpendicular to the first reference axis is a partial line segment of a reference circle. A center of the reference circle is on the first reference axis. The number of the plurality of first evading portions, the number of the plurality of the plurality of first abutting portions, the number of the plurality of second evading portions, and the number of the plurality of second abutting portions are six, respectively.

In an example, an inner wall of the receiving hole is recessed with an annular slot extended around the first reference axis and located adjacent to an opening at the second end of the receiving hole, and a retaining ring is arranged in the annular slot.

In an example, the driving member further has a neck formed between the rounded base and the driving column and adjacent the rounded base. The retaining ring is located between the neck and the rounded base. A maximum width of the rounded base in a radial direction of the second reference axis is greater than a minimum width of the retaining ring in a radial direction of the first reference axis.

The present invention will become clearer in light of the following detailed description of illustrative embodiments of this invention described in connection with the drawings.

DETAILED DESCRIPTION OF THE INVENTION

Figure 1:
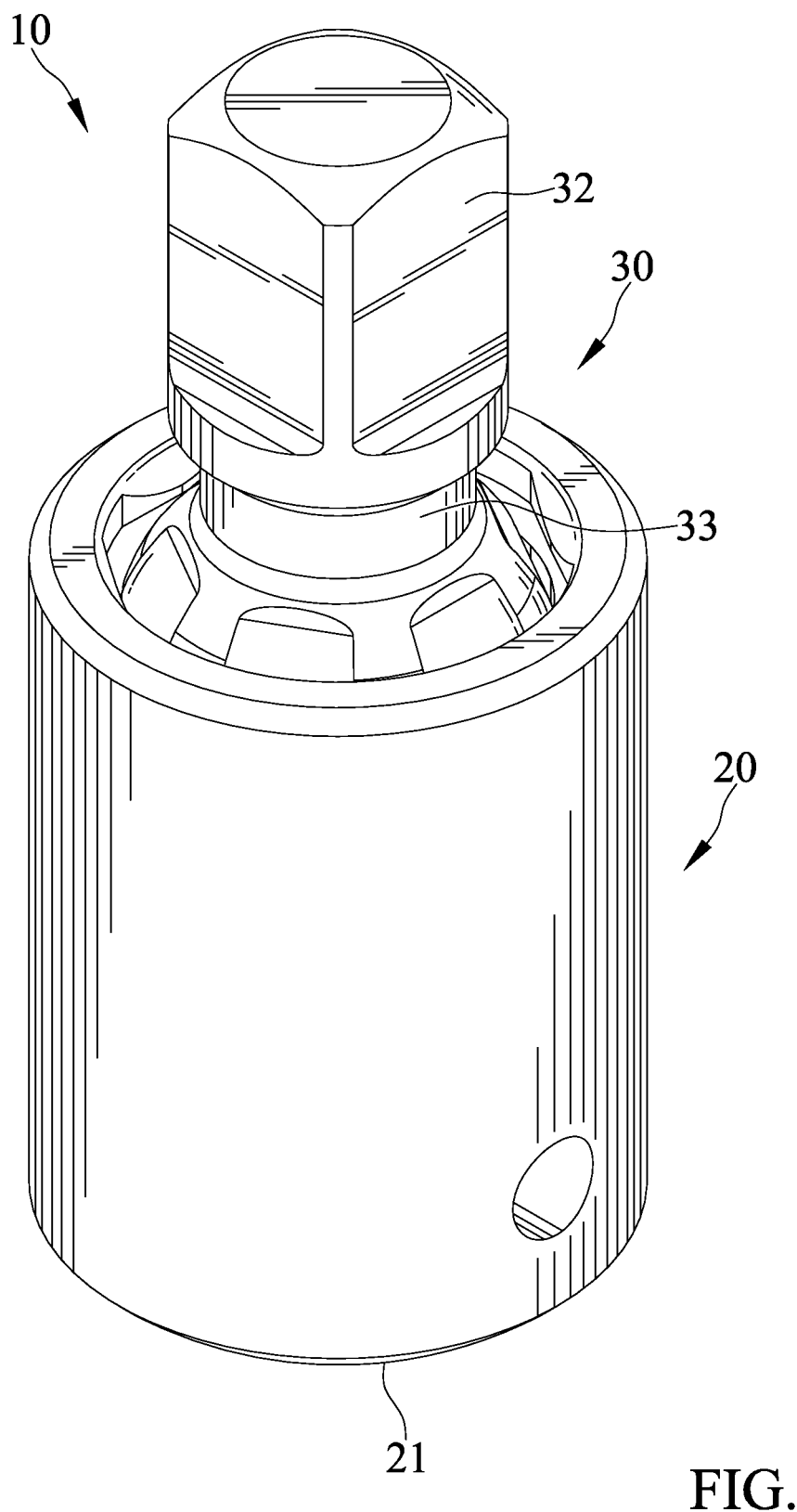
FIG. 1 is a perspective view of a universal joint of an embodiment according to the present invention.
Figure 2:
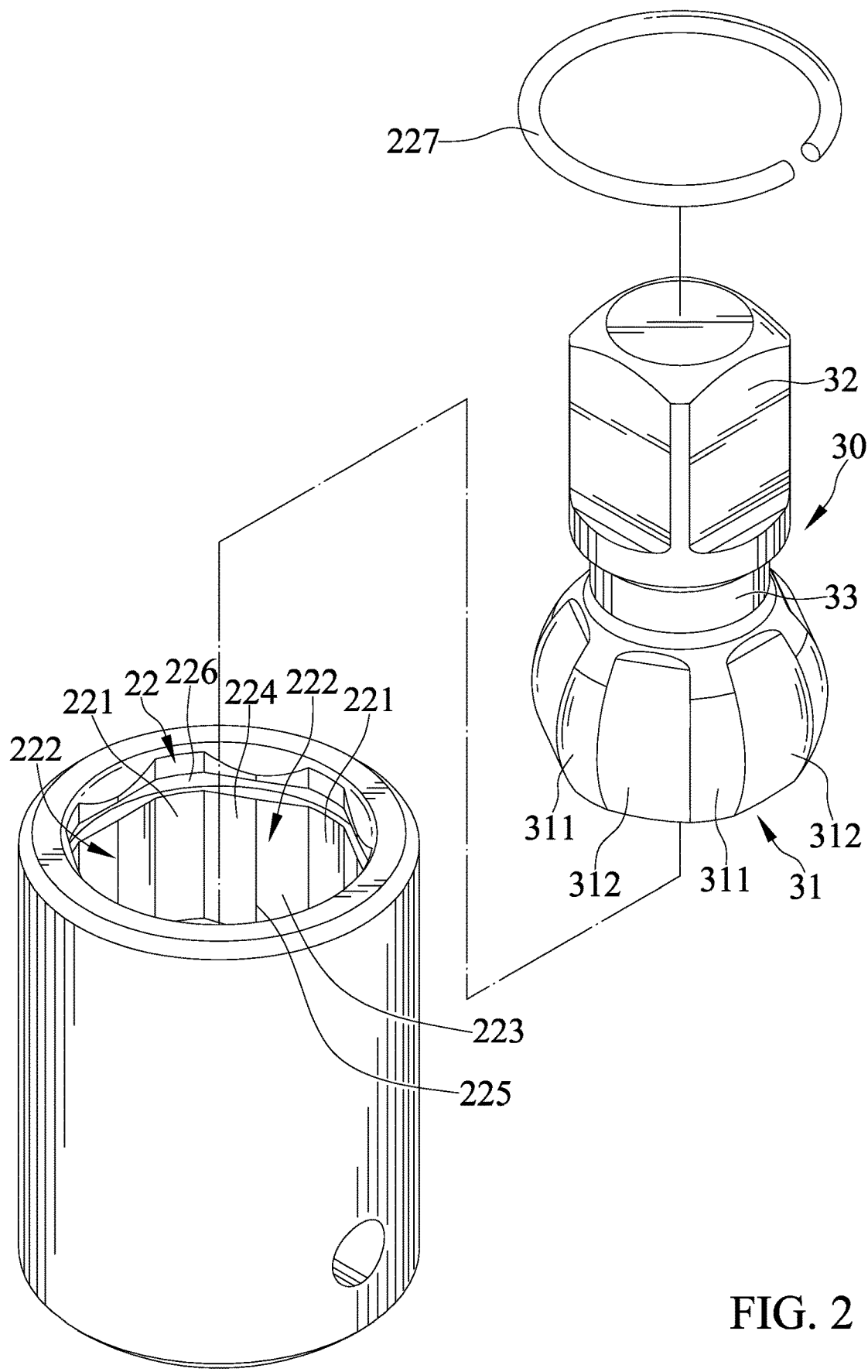
FIG. 2 is an exploded, perspective views of the universal joint of FIG. 1.
Figure 3:
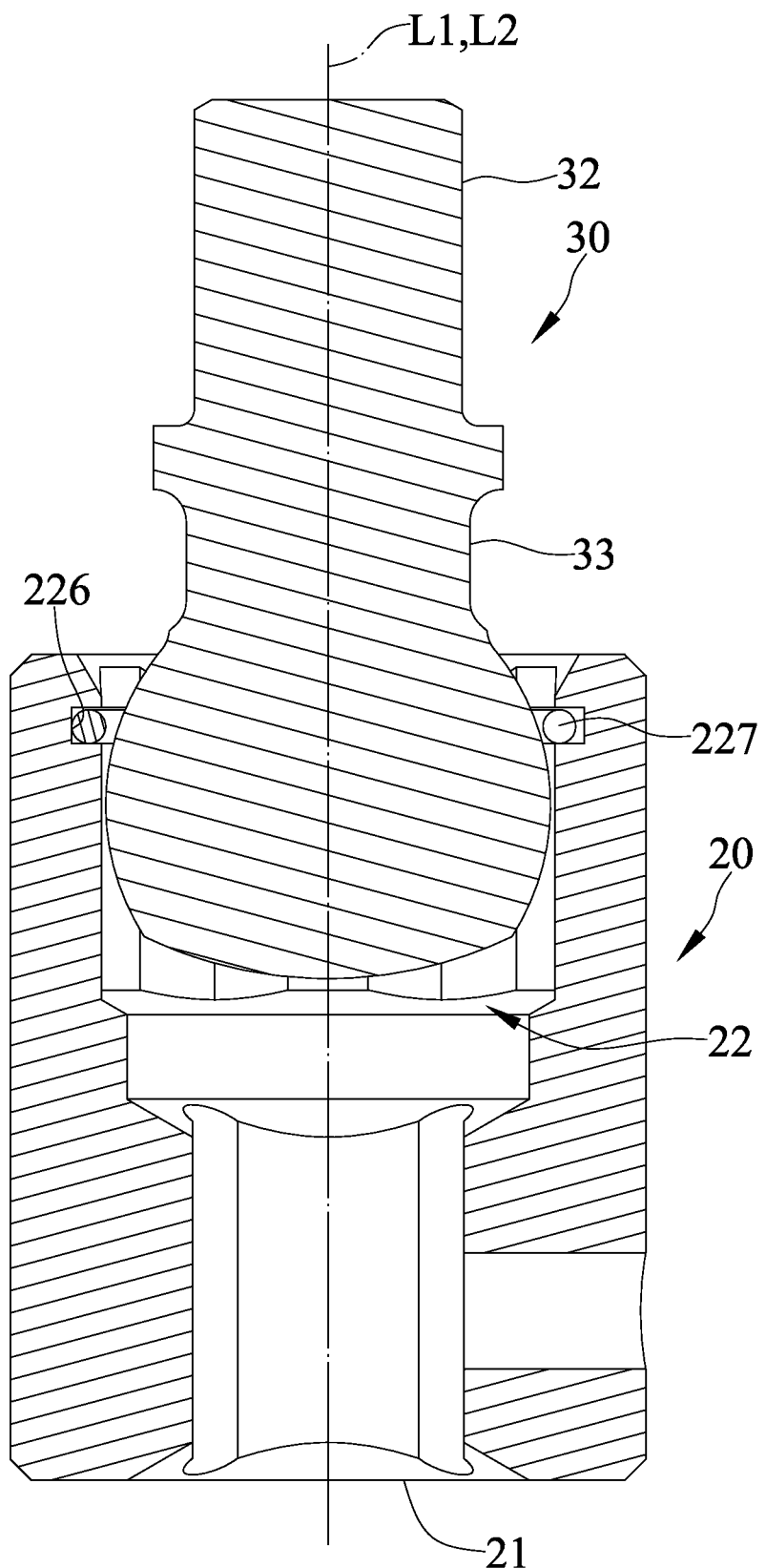
FIGS. 3 and 4 are cross-sectioned views of the universal joint of FIG. 1.
Figure 4:
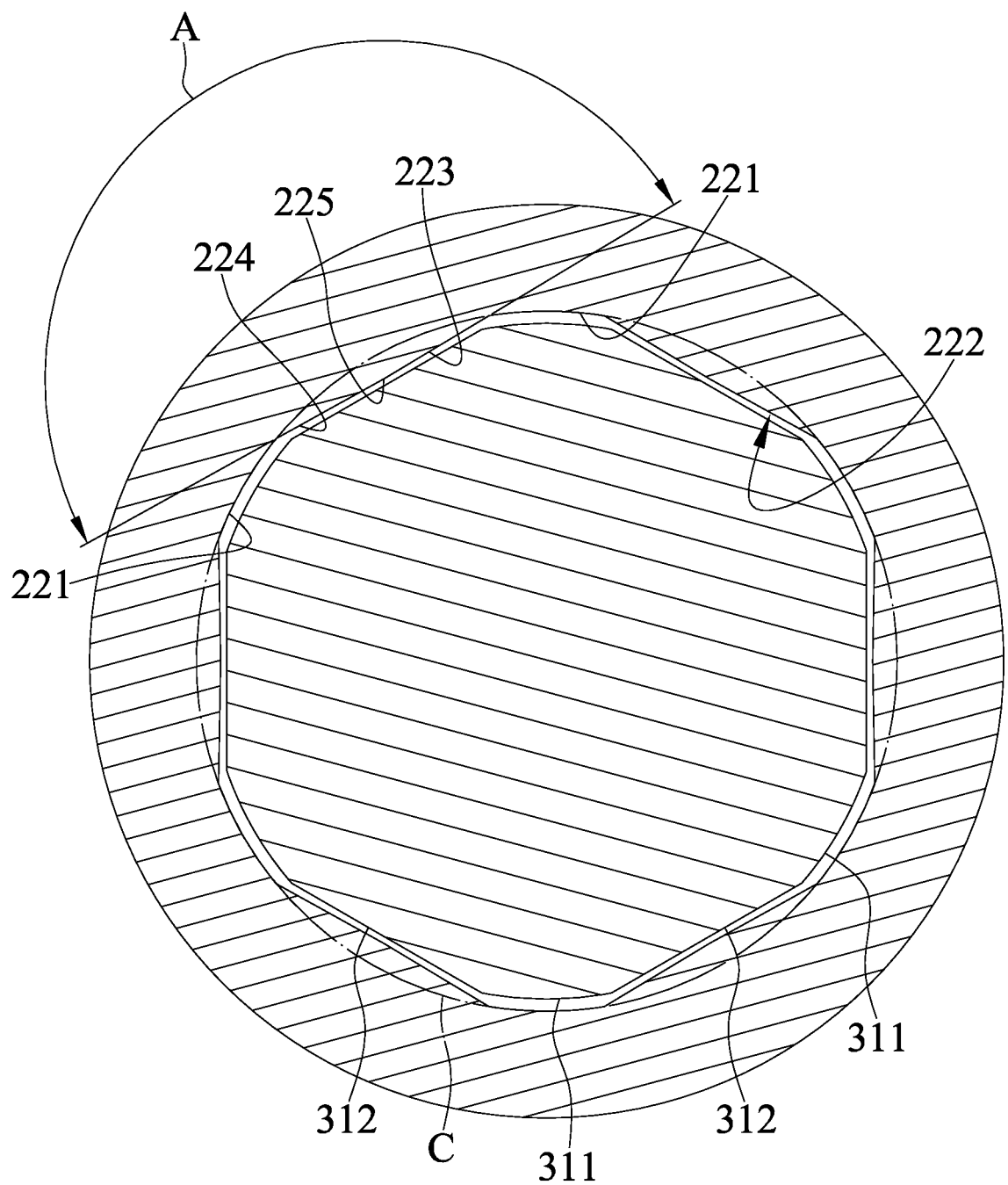

With reference to FIGS. 1-4, a universal joint 10 of an embodiment according to the present invention includes a socket member 20 and a driving member 30.

The socket member 20 defines a first end 21 and a second end opposite the first end and includes a receiving hole 22 axially extending inward from the second end along a first reference axis L1. An inner periphery of the receiving hole 22 is formed with a plurality of first evading portions 221 and a plurality of first abutting portions 222 respectively extending linearly along a direction parallel to the first reference axis L1 and staggered with each other to cause the plurality of first abutting portions 222 not connected to each other. Each of the plurality of first abutting portions 222 is provided with a first abutting face 223, a second abutting face 224 connected to the first abutting face 223, and an adjacent edge 225 formed between the first abutting face 223 and the second abutting face 224 and extending along the direction parallel to the first reference axis L1. One side of the adjacent edge 225 opposite to the first reference axis L1 forms an adjacent edge angle A being greater than 177 degrees and less than 180 degrees. In a preferred form, the adjacent edge angle A is 178 degrees.

The driving member 30 axially extends along a second reference axis L2 and has a rounded base 31 arranged in the receiving hole 22 and a driving column 32 opposite to the rounded base 31. Thus, the driving member 30 can pivot relative to the socket member 20 to make the first reference axis L1 and the second reference axis L2 overlap each other, or intersect to form an included angle.

Any one of the plurality of first evading portions 221 is in the shape of a circular arc on a reference plane perpendicular to the first reference axis L1. One side of the first abutting face 223 opposite to the second abutting face 224 is connected to one of the plurality of first evading portions 221. One side of the second abutting face 224 opposite to the first abutting face 223 is connected to another one of the plurality of first evading portions 221.

An outer periphery of the rounded base 31 forms a plurality of second evading portions 311 and a plurality of second abutting portions 312 staggered with each other around the second reference axis L2. The plurality of second evading portions 311 corresponds the plurality of first evading portions 221, and the plurality of second abutting portions 312 corresponds the plurality of first abutting portions 222.

Any one of the plurality of second evading portions 311 is in the shape of a circular arc on a reference plane perpendicular to the second reference axis L2. Any one of the plurality of second abutting portions 312 is in the shape of a straight line on a reference plane perpendicular to the second reference axis L2. The circular arc of any one of the plurality of first evading portions 221 on the reference plane perpendicular to the first reference axis L1 is a partial line segment of a reference circle C. A center of the reference circle C is on the first reference axis L1. In the embodiment, the number of the plurality of first evading portions 221, the number of the plurality of the plurality of first abutting portions 222, the number of the plurality of second evading portions 311, and the number of the plurality of second abutting portions 312 are six, respectively.

An inner wall of the receiving hole 22 is recessed with an annular slot 226 extended around the first reference axis L1 and located adjacent to an opening at the second end of the receiving hole 22. A retaining ring 227 is arranged in the annular slot 226.

The driving member 30 further has a neck 33 formed between the rounded base 31 and the driving column 32 and adjacent the rounded base 31. The retaining ring 227 is located between the neck 33 and the rounded base 31. A maximum width of the rounded base 31 in a radial direction of the second reference axis L2 is greater than a minimum width of the retaining ring 227 in a radial direction of the first reference axis L1.

Thus, the universal joint 10 can ensure smooth operation and prevent the rounded base 31 of the driving member 30 being stuck in the receiving hole 22 of the socket member 20. When the universal joint 10 is driven to rotate by a power tool such as a pneumatic tool, the torque at the moment of starting is quite large. The above structure of universal joint 10 can prevent the rounded base 31 of the driving member 30 being stuck in the corner of the receiving hole 22 of the socket member 20 under the excessive torque to unable pivoting relative to the socket member 20.

Although specific embodiments have been illustrated and described, numerous modifications and variations are still possible without departing from the scope of the invention. The scope of the invention is limited by the accompanying claims.

The invention claimed is:

1. A universal joint comprising:
   a socket member defining a first end and a second end opposite the first end and including a receiving hole axially extending inward from the second end along a first reference axis,
      wherein an inner periphery of the receiving hole is formed with a plurality of first evading portions and a plurality of first abutting portions respectively extending linearly along a direction parallel to the first reference axis and staggered with each other to cause the plurality of first abutting portions not connected to each other,
      wherein each of the plurality of first abutting portions is provided with a first abutting face, a second abutting face connected to the first abutting face, and an adjacent edge formed between the first abutting face and the second abutting face and extending along the direction parallel to the first reference axis, and
      wherein one side of the adjacent edge opposite to the first reference axis forms an adjacent edge angle being greater than 177 degrees and less than 180 degrees; and
   a driving member axially extending along a second reference axis and having a rounded base arranged in the receiving hole and a driving column opposite to the rounded base.

2. The universal joint as claimed in claim 1, wherein the adjacent edge angle is 178 degrees.

3. The universal joint as claimed in claim 1, wherein any one of the plurality of first evading portions is in the shape of a circular arc on a reference plane perpendicular to the first reference axis,
   wherein one side of the first abutting face opposite to the second abutting face is connected to one of the plurality of first evading portions, and
   wherein one side of the second abutting face opposite to the first abutting face is connected to another one of the plurality of first evading portions.

4. The universal joint as claimed in claim 3, wherein an outer periphery of the rounded base forms a plurality of second evading portions and a plurality of second abutting portions staggered with each other around the second reference axis,
   wherein the plurality of second evading portions corresponds to the plurality of first evading portions,
   wherein the plurality of second abutting portions corresponds to the plurality of first abutting portions,
   wherein any one of the plurality of second evading portions is in the shape of a circular arc on a reference plane perpendicular to the second reference axis, and
   wherein any one of the plurality of second abutting portions is in the shape of a straight line on a reference plane perpendicular to the second reference axis.

5. The universal joint as claimed in claim 4, wherein the circular arc of any one of the plurality of first evading portions on the reference plane perpendicular to the first reference axis is a partial line segment of a reference circle,
   wherein a center of the reference circle is on the first reference axis, and
   wherein the number of the plurality of first evading portions, the number of the plurality of the plurality of first abutting portions, the number of the plurality of second evading portions, and the number of the plurality of second abutting portions are six, respectively.

6. The universal joint as claimed in claim 5, wherein an inner wall of the receiving hole is recessed with an annular slot extended around the first reference axis and located adjacent to an opening at the second end of the receiving hole, and wherein a retaining ring is arranged in the annular slot.

7. The universal joint as claimed in claim 5, wherein the driving member further has a neck formed between the rounded base and the driving column and adjacent the rounded base, wherein the retaining ring is located between the neck and the rounded base, and wherein a maximum width of the rounded base in a radial direction of the second reference axis is greater than a minimum width of the retaining ring in a radial direction of the first reference axis.

\* \* \* \* \*